(12) United States Patent
Claybrough et al.

(10) Patent No.: US 11,964,763 B2
(45) Date of Patent: Apr. 23, 2024

(54) MOTORIZED FLYING CRAFT FOR MEASURING THE RELIEF OF SURFACES OF A PREDETERMINED OBJECT AND METHOD FOR CONTROLLING SUCH A CRAFT

(71) Applicant: DONECLE, Labege (FR)

(72) Inventors: Matthieu Claybrough, Toulouse (FR); Alban Deruaz-Pepin, Balma (FR); Josselin Bequet, Fonsorbes (FR)

(73) Assignee: DONECLE, Labege (FR)

( * ) Notice: Subject to any disclaimer, the term of this patent is extended or adjusted under 35 U.S.C. 154(b) by 632 days.

(21) Appl. No.: 17/256,648

(22) PCT Filed: Jul. 22, 2019

(86) PCT No.: PCT/FR2019/051822
§ 371 (c)(1),
(2) Date: Dec. 29, 2020

(87) PCT Pub. No.: WO2020/021191
PCT Pub. Date: Jan. 30, 2020

(65) Prior Publication Data
US 2021/0261251 A1 Aug. 26, 2021

(30) Foreign Application Priority Data

Jul. 26, 2018 (FR) ...................... 1856985

(51) Int. Cl.
*B64C 39/02* (2023.01)
*B64U 10/13* (2023.01)
(Continued)

(52) U.S. Cl.
CPC ............ *B64C 39/024* (2013.01); *G01S 17/89* (2013.01); *G05D 1/0094* (2013.01); *B64U 10/13* (2023.01); *B64U 2101/30* (2023.01)

(58) Field of Classification Search
CPC ..... B64C 39/024; G01S 17/89; G05D 1/0094; B64U 10/13; B64U 2101/30
See application file for complete search history.

(56) References Cited

U.S. PATENT DOCUMENTS

2015/0377405 A1* 12/2015 Down ................. G05D 1/0011
244/76 R
2016/0378895 A1* 12/2016 Gnecco ................. H04N 23/00
701/2
(Continued)

FOREIGN PATENT DOCUMENTS

WO WO2017153912 9/2017

*Primary Examiner* — Peter D Nolan
*Assistant Examiner* — Mikko Okechukwu Obioha
(74) *Attorney, Agent, or Firm* — CRGO Global; Steven M. Greenberg

(57) ABSTRACT

The invention relates to a motorized flying craft (10) for measuring the contour of a plurality of regions of interest (12a, 12b, 12c) of a surface of a predetermined object (9) to be inspected, said flying craft (10) comprising a carrier frame (20) and motorized means (11, 13) for lifting and moving said carrier frame (20). The flying craft is characterized in that it further comprises an apparatus (14) for three-dimensional measurement of a region of interest (12a, 12b, 12c) targeted by said apparatus (14), and a management system (34, 35) of said craft configured to be able to switch said craft from a navigation mode, in which the craft can be moved from one region of interest to a subsequent region of interest, to a stabilized mode, in which said motorized lifting and movement means (11, 13) are controlled so as to be able to keep at least one kinematic parameter of said craft constant, making it possible to minimize the vibration of said craft, and in which said measurement apparatus (14) can acquire a three-dimensional measurement of a region of interest.

14 Claims, 3 Drawing Sheets

Figure 1:
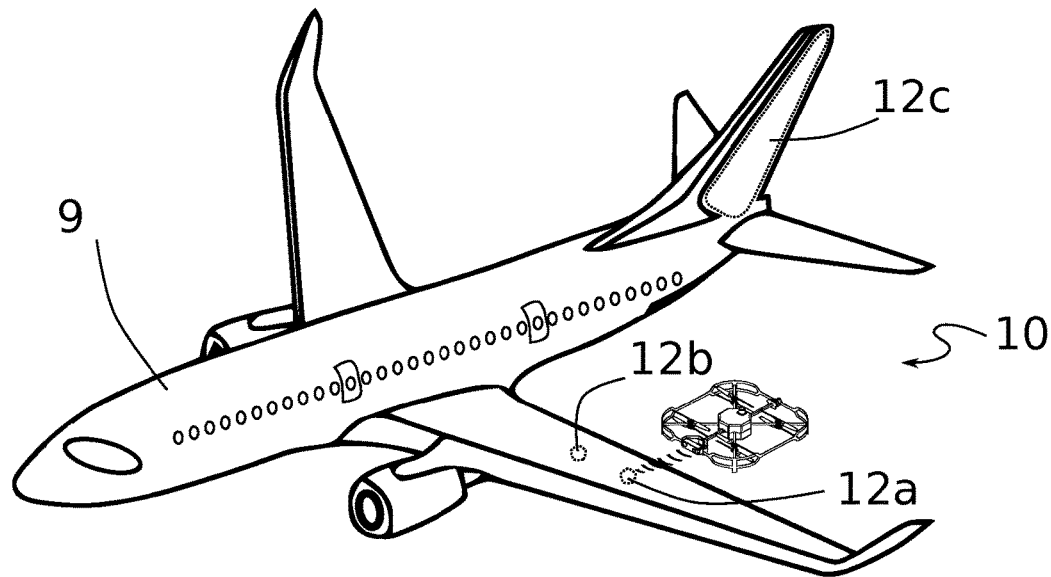

(51) Int. Cl.
  *B64U 101/30*   (2023.01)
  *G01S 17/89*   (2020.01)
  *G05D 1/00*   (2006.01)

(56)          References Cited

U.S. PATENT DOCUMENTS

2017/0297745 A1* 10/2017 Engel ................. G01M 5/0016
2019/0094887 A1*  3/2019 Di ......................... G05D 1/101
2019/0128772 A1*  5/2019 Heinrich ................ H04N 13/00
2020/0377233 A1* 12/2020 Harvey ................. B64D 47/02
2021/0131073 A1*  5/2021 Wisley ................. B60W 30/00
2022/0172343 A1*  6/2022 Lefebvre Albaret .......................
                                                G01N 21/9515
2022/0172344 A1*  6/2022 Dominguez ........... H04N 23/90

* cited by examiner

MOTORIZED FLYING CRAFT FOR MEASURING THE RELIEF OF SURFACES OF A PREDETERMINED OBJECT AND METHOD FOR CONTROLLING SUCH A CRAFT

CROSS-REFERENCE TO RELATED APPLICATIONS

This application is a § 371 national phase entry of International Application No. PCT/FR2019/051822, filed Jul. 22, 2019, which claims priority to French Patent Application No. 1856985, filed Jul. 26, 2018.

1. TECHNICAL FIELD OF THE INVENTION

The invention relates to a robot for automatic inspection of surfaces of large predetermined objects, such as aircraft, wind turbines, watercraft, large engineering structures, etc., allowing the contours of the defects of the detected surface to be detected and measured.

2. TECHNOLOGICAL BACKGROUND

The applicant has developed a system for automatic inspection of surfaces of large objects, such as aircraft, wind turbines, watercraft, large engineering structures, buildings, etc. which makes it possible to detect any anomalies on the inspected surfaces, for example chips caused by lightning, chips caused by hail, traces of corrosion, cracks, and generally all types of defects of the surfaces inspected in relation to a nominal state of these surfaces. This system was the subject of patent application WO2016203151.

The applicant sought to improve its system by equipping the drones of its inspection system with means for detecting and measuring contours. Such a contour detection and measurement system aims to be able to characterize the surface defects detected by the object surface inspection system.

Throughout the text, a contour of a surface denotes a variation of said surface along an axis perpendicular to the plane of the surface, either protruding (positive variation of the surface) or hollow (negative variation of the surface).

It is necessary to be able to detect and measure the depressions (hollows) or the bumps (protrusions) of the surface defects detected on the inspected objects, for example after a hailstorm. In particular, in the case of inspection of an aircraft, the detection and automatic characterization of the contour of chips caused by hail makes it possible to alert the maintenance teams as soon as the depth of a chip is greater than a predetermined value.

It is also necessary to be able to monitor certain specific regions of the aircraft, such as the peripheries of the aircraft access doors (passenger or freight access), due to the regular impacts between the aircraft and the airport apparatus during passenger and/or freight loading/unloading operations.

In general, it is necessary be able to automatically detect and measure the depth of surface defects detected by a robot for automatic inspection of surfaces of predetermined objects.

It is also necessary to be able to automatically detect any misalignment between different panels of an aircraft so as to minimize the fuel consumption of the aircraft. For example, a defect in the alignment of a flap or an airbrake of an aircraft with respect to its nominal position can lead to an additional fuel cost of 10,000 USD per month.

To date, the known solutions for measuring the depth of a surface of a predetermined object, such as an aircraft, are divided into two large families, namely the contact solutions, of the depth gauge type, and the contactless solutions, of the 3D scanner type.

A depth gauge comprises a fixed base which rests on a reference surface extending around the depression, of which the depth is intended to be measured, and a movable contact part placed above the depression and configured to be movable by an operator from an idle position to a position of contact with the deepest region of the measured depression. The depth difference between the reference surface around the depression and the region of contact with the movable part determines the depth of the depression. This depth measurement is read on a needle dial or liquid crystal display.

This solution has the advantage of being easily transportable, but requires physical access to the depression by the operator in order to set up the depth gauge. In addition, the operation must be repeated for each depression. Such an operation is therefore long and grueling when it comes to determining the damage caused by a hailstorm, for example, which can cause more than one hundred chips. In addition, the accuracy of a measurement by a depth gauge depends highly on the positioning of the gauge, both at its base (reference surface) and at the contact tip, which should ideally be placed above the maximum depth region of the depression. This region of maximum depth is difficult to detect with the naked eye, and it is therefore necessary in practice to take measurements of the same depression several times at different points in order to obtain a reliable measurement of the depression.

A 3D scanner no longer requires contact between the depression and the detection tool. Said tool emits a light signal which is reflected by the depression and analyzed by the scanner. Such a tool therefore allows faster inspections than depth gauge solutions. However, it always requires physical access by the operator to the depression to be measured. Another drawback of both 3D scanners and depth gauges is that they do not allow the position of the defect to be associated with the measurement of the depression. In other words, it is necessary to be able to locate the defect using measurements relative to other reference points of which the position is known, which complicates the process of characterizing the depressions on a large object such as an aircraft.

The inventors therefore sought to develop a new solution for measuring the depth of regions of interest on a surface of a large object such as an aircraft, a wind turbine, a building, a large engineering structure, etc.

3. AIMS OF THE INVENTION

The invention thus aims to provide a device for measuring the contour (depression or bump) of a surface of a large predetermined object, such as an aircraft, a wind turbine, a watercraft, a large engineering structure, etc.

The invention aims in particular to provide a device for measuring the contour of a surface which does not require a human presence in the vicinity of the inspected regions of the surface.

The invention also aims to provide, in at least one embodiment of the invention, a measurement device which can acquire a plurality of measurements of the contour of a plurality of regions of interest of a surface quickly and repeatably. The aim of the invention is in particular to allow the acquisition of three-dimensional measurements of an entire surface of the object, or even of the object in its entirety, in which case said plurality of regions of interest forms the entire surface of the object or the whole object.

The invention also aims to provide, in at least one embodiment, a device of this kind which makes it possible to measure contours with an accuracy of approximately 0.1 mm.

The invention also aims to provide, in at least one embodiment, a device of this kind which makes it possible to acquire measurements at a distance of 50 to 100 cm from the inspected surface.

The invention also aims to provide, in at least one embodiment of the invention, a measurement device which makes it possible to provide the position of the measured contours with respect to a reference point linked to the inspected surface.

Finally, the invention aims to provide a method for controlling a device for measuring the contour.

4. DISCLOSURE OF THE INVENTION

To do this, the invention relates to a motorized flying craft for measuring the contour of a plurality of regions of interest of a surface of a predetermined object to be inspected, said flying craft comprising a carrier frame and motorized means for lifting and moving said carrier frame.

A flying craft according to the invention, also referred to in the following as a drone or inspection robot, is characterized in that it further comprises:

- an apparatus for three-dimensional measurement of a region of interest targeted by said apparatus, said apparatus being mounted on a pod which is mechanically connected to said carrier frame, and comprising a wave emission source, said wave being referred to as a reference wave, a matrix receiver of a wave reflected by said region of interest targeted by said apparatus, and a processing unit configured to be able to determine a measurement of the contour of said region of interest targeted by said apparatus from the analysis of said reference wave and said reflected wave,
- an automatic management system of said craft, configured to be able to switch said craft from a mode referred to as navigation mode, in which the craft can be moved from a region of interest toward a subsequent region of interest by controlling the motorized lifting and movement means, to a mode referred to as stabilized mode, in which said motorized lifting and movement means are controlled so as to be able to keep at least one kinematic parameter of said craft constant, making it possible to minimize the vibration of said craft, and in which said measurement apparatus can acquire a three-dimensional measurement of this region of interest.

A flying craft according to the invention forms a device for measuring the contour of a plurality of regions of interest of a surface which does not require human presence at the regions of interest to be inspected. This plurality of regions of interest of a surface of an object may consist of a plurality of distinct non-adjacent regions of the surface of an object, or may form an entire surface of an object or the object in its entirety. In the following, the concept of a plurality of regions of interest is used to refer to a set of regions to be inspected, it being possible for these regions to be separate or joined to form an entire surface and/or an object in its entirety.

This plurality of regions of interest is known in advance. In other words, the invention is based on a list of regions of interest provided to the craft. On the basis of this list of regions of interest, which is, for example, provided by an automatic surface inspection system proposed by the applicant in patent application WO2016/203151 which makes it possible to automatically detect a list of defects on a surface of a predetermined object which is an aircraft, wind turbine, building, large engineering structure, etc., the craft according to the invention automatically measures the contours of each of these regions of interest. According to another variant, the craft receives the list of regions of interest to be inspected in real time. This list can also be reduced to a single region so that the contour measurement can be carried out as soon as the automatic inspection system described in the aforementioned application detects a surface defect. The regions of interest are provided to the craft according to the invention in the form of a list of regions, thus making it possible to define a first region of interest, the subsequent region of interest, and so on until the last region of interest. This classification of regions can be of any type and is preferably established on the basis of the position of the regions relative to each other so as to minimize the movement of the craft from one region of interest to the subsequent region.

A flying craft according to the invention can be deployed much more quickly than the measurement devices from the prior art of the depth gauge or 3D scanner type.

In addition, a craft according to the invention is fully automatic, such that the risk of error is much lower than with devices from the prior art which require the intervention of an operator.

One of the innovative features of the invention is the presence of an automatic management system configured to be able to switch the flying craft from a navigation mode, during which it can be moved from a region of interest of which it has just made a three-dimensional measurement toward a subsequent region of interest which needs to be measured, to a stabilized mode, during which the acquisition of the measurement of the contour of the new region of interest is carried out while keeping at least one kinematic parameter of the craft constant so as to minimize the vibration of the craft. This makes it possible to minimize the interferences linked to the operation of the motors during the acquisition of the measurement of the region of interest in question.

Advantageously and according to the invention, at least one kinematic parameter of the craft kept constant in said stabilized mode is selected from the group comprising the position of the craft, the speed of the craft, the acceleration of the craft, the attitude of the craft, and a function of one or more of these parameters.

According to this variant, the stability of the craft allowing the acquisition of three-dimensional measurement is obtained by keeping one or more of the following kinematic parameters constant: position, speed, acceleration, attitude. This makes it possible to minimize the movements of the craft in the vicinity of the region of interest to be measured, and to acquire precise measurements of the depth of this region.

Advantageously and according to the invention, said automatic management system is configured to be able, in the vicinity of each region of interest, to switch from navigation mode to stabilized mode when said craft is in a state which is defined by at least one kinematic parameter of the craft and adjacent to a state referred to as the anticipation state, which is defined by at least this kinematic parameter of the craft, and determined from a state referred to as the acquisition state which corresponds to a target value of this kinematic parameter for carrying out the acquisition of this region of interest and to a time delay referred to as the anticipation time delay which corresponds to the time necessary to guarantee that this parameter is kept constant by the craft, allowing the acquisition of a three-dimensional measurement of said region of interest by said measurement apparatus.

According to this advantageous variant, the craft is switched to stabilized mode in the vicinity of the region of interest when the craft is in an anticipation state, characterized in particular by its position, its speed, its inclination, and/or its acceleration, etc., and determined from the target state of the craft for acquiring the measurement of the region of interest. This anticipation state is reached when the difference in speed and acceleration between the state of the craft and the acquisition state is below a predetermined threshold. The state of the craft is determined by reading sensors linked to the craft, such as laser rangefinders and inertial sensors. This acquisition state also takes into account an anticipation time delay which corresponds to the time necessary to guarantee the that the kinematic parameter in question is kept constant while the three-dimensional measurement is acquired by said measurement apparatus.

Thus, the anticipation state is the state of the craft, defined e.g. by its position, its speed and its acceleration, from which the acquisition state is reached by the craft at the end of the anticipation time delay, taking into account the instructions provided to the motors of the craft.

Advantageously and according to the invention, the pod comprises a motorized joint having at least one pitch axis of the measurement apparatus relative to said carrier frame, so as to be able to position said apparatus opposite a region of interest to be measured.

Advantageously and in conjunction, the joint also has a roll axis of the measurement apparatus relative to the carrier frame.

This advantageous variant makes it possible to point the pod, and therefore the three-dimensional measurement apparatus carried by the pod, in all directions in a stable manner. It is therefore possible to acquire the contour measurement in all directions. Indeed, the rolling movement (rotation of the apparatus about a longitudinal axis defined by the front-to-rear direction of the craft, which is generally the direction perpendicular to the main direction of lateral movement of the craft for maintaining said craft at a constant distance from the surface it is inspecting) is obtained via the motorized joint of the pod; the pitch movement (rotation of the apparatus about a transverse axis, which is therefore generally the direction of movement of the craft) is obtained via the motorized joint of the pod; and the yaw movement (horizontal rotation of the apparatus about a vertical axis defined by gravity) is obtained via the yaw movement of the craft itself.

This advantageous variant also makes it possible to keep the measurement apparatus horizontal even when the flying craft is not.

Advantageously and according to this variant, the flying craft has a main direction of progressive motion and said pod is mounted at the front of the flying craft defined in a direction perpendicular to this main direction of progressive motion.

This advantageous variant makes it possible to bring the three-dimensional measurement apparatus closer to the surface to be inspected, and to acquire measurements both from above a region of interest or from below a region of interest. In other words, a craft according to this variant makes it possible to inspect the surfaces by placing the craft above a surface to be inspected, below a surface to be inspected or in front of the surface to be inspected, which offers multiple possibilities depending on the surface and the space requirement around the surface to be inspected.

According to an advantageous variant, the pod is connected to the carrier frame by damping parts so as to be able to absorb the vibration which results from the operation of the lifting and movement means of the craft, and from turbulence. These damping parts are parts made of elastomers or of silicone gel, for example.

Advantageously and according to the invention, the craft further comprises at least one inertial sensor carried by said pod.

Such an inertial sensor comprises three accelerometers and three gyroscopes, for example. It thus makes it possible to determine the orientation of the pod and therefore the orientation of the three-dimensional measurement apparatus with respect to the surface to be inspected. This inertial sensor also participates in the control of the motorized joint of said pod in order to follow a predetermined positioning instruction of the pod.

According to a variant of the invention, the craft can also comprise a second inertial sensor carried on the carrier frame and making it possible to estimate the state of the craft.

Advantageously and according to the invention, the craft further comprises at least one laser rangefinder which is rigidly connected to said carrier frame or to said pod and forms a sensor of the relative position of the flying craft with respect to said surface of the object to be inspected.

A craft according to this variant therefore makes it possible to estimate the relative position of the craft, and therefore of the three-dimensional measurement apparatus, with respect to the surface to be inspected. Thus, the combination of the information provided by the laser rangefinder and the inertial sensor(s) makes it possible to know the precise position and orientation of the apparatus with respect to the regions of interest of the surface to be inspected.

This knowledge of the position and orientation of the measurement apparatus, associated with the automatic management system, makes it possible to acquire precise and quick measurements of the regions of interest of the surface to be inspected.

Advantageously and according to this variant, the craft comprises at least two laser rangefinders configured to be able to scan said surface to be inspected along at least two intersecting planes.

This variant makes it possible to have more precise measurements of the relative position of the craft with respect to the surface of the object to be inspected.

Advantageously and according to the invention, said automatic management system controls the switch to stabilized mode as soon as the laser rangefinder(s) determine(s) that the craft is at a predetermined position relative to said region of interest.

Advantageously and according to the invention, the craft further comprises a compensation module of the three-dimensional measurement acquired by said measurement apparatus suitable for defining a movement profile of said craft during said acquisition and correcting said measurements on the basis of this profile of movement.

Such a compensation module makes it possible, for example, to estimate the relative speed of the craft with respect to said surface so as to be able to compensate for the movements of the flying craft during the processing of said waves received by the matrix receiver of said measurement apparatus.

This advantageous variant makes it possible to take into account the movement profile of the craft during the acquisition so as to obtain precise measurements of the contour.

This variant also makes it possible to take into account the speed of movement of the craft and to adapt the management sequence using the navigation system on the basis of this estimated speed. This makes it possible in particular to acquire the contour measurements while keeping the flying craft moving. This advantageous variant also makes it possible to compensate for both the translational speed and the angular speed of said measurement apparatus.

Advantageously and according to the invention, the craft further comprises a module for accessing a three-dimensional model of said surface of said object and a module for locating the relative position of the craft with respect to said three-dimensional model of said surface of said object to be inspected, so as to be able to associate, with each region of interest targeted by said measurement apparatus, the coordinates of the region of interest in a reference point of said three-dimensional model of said surface.

This advantageous variant makes it possible to have a three-dimensional model of the surface to be inspected. This three-dimensional model is, for example, saved in a memory on board the craft or retrieved from a remote server by a wireless communication system on board the craft. This advantageous variant makes it possible to benefit from a model of the surface of the object which is known in advance. This 3D model of the surface is, for example, formed by a 3D polygon mesh of the surface. This advantageous variant also makes it possible to be able to determine the position of the craft with respect to the surface for which a 3D model is known. This determination of the position of the craft relative to the modeled surface can, for example, implement the method for determining the position of a mobile craft proposed by the applicant in patent application WO2017/121936.

This advantageous variant also makes it possible to precisely locate the position of each region of interest of the surface to be inspected.

Advantageously and according to the invention, the craft further comprises a module for wireless transmission of the contour measurements to a ground station.

Advantageously and according to the invention, the craft further comprises a module for determining a depth map, comprising a sub-module for determining a reference contour of said surface of said inspected object from a predetermined 3D model of said surface of the inspected object associated with a predetermined mathematical model, and a sub-module for calculating the differences in depth between said measurements of the contour of said predetermined regions and said reference contour.

This advantageous variant makes it possible to create a depth map containing any detected defects.

Advantageously and according to the invention, said three-dimensional measurement apparatus comprises a camera for emitting structured light, which forms said emission source of said reference wave, and a camera for acquiring images of said region of interest illuminated by structured light, which forms said matrix receiver of said reflected wave.

According to another advantageous variant of the invention, said three-dimensional measurement apparatus comprises a laser profilometer which forms said source of emission of said reference wave, and a camera for acquiring the image of said region of interest illuminated by said laser profilometer, which forms said matrix receiver of said reflected wave.

According to another advantageous variant of the invention, said three-dimensional measurement apparatus comprises a flash lidar which forms said source of emission of said reference wave, and a camera for acquiring the image of said region of interest illuminated by said lidar flash, which forms said matrix receiver of said reflected wave.

Advantageously and according to the invention, said means for lifting and moving said craft comprise at least four propulsion motors. Such a craft thus forms, for example, a multirotor drone having four propellers, each being driven by an electric motor. This can also be a multirotor drone having six or eight propellers for more stability and redundancy.

This advantageous variant makes it possible in particular to give the craft the ability to hover, which is particularly useful in the vicinity of the regions of interest during the acquisition of the three-dimensional measurements.

The invention also relates to a method for controlling a motorized flying craft according to the invention.

A method according to the invention is characterized in that it comprises the steps of:
- defining a list of regions of interest of a surface of a predetermined object to be inspected,
- defining a navigation profile of the craft between the different regions of interest according to a predetermined chronology,
- moving the flying craft toward a first region of interest,
- adjusting the pod of the craft so that it points to said region to be measured with said three-dimensional measurement apparatus,
- in the immediate vicinity of the region of interest, switching the craft to stabilized mode and triggering the acquisition of the three-dimensional measurement of the region of interest,
- when the acquisition is finished, switching the craft to navigation mode,
- moving the flying craft toward the next region of interest of the navigation profile and repeating the previous operations until the last region of interest of said navigation profile.

A method according to the invention therefore makes it possible to automatically measure the contours of the plurality of regions of interest. The method according to the invention adapts the navigation mode according to its position relative to the regions of interest. The method according to the invention makes it possible in particular to determine the next region to be inspected according to the established navigation profile, and to move the craft to this region of interest. The method also makes it possible to orient the pod carrying the acquisition apparatus. The method then makes it possible to switch the craft to stabilized mode designed for the acquisition of three-dimensional measurements in order to limit the interferences linked to the motorized lifting and movement means. Finally, the method makes it possible to switch back to navigation mode when the acquisition is complete in order to reach the next region of interest according to the established navigation profile.

The invention also relates to a flying craft and a method for controlling such a flying craft, characterized in combination by all or some of the features mentioned above or below.

5. LIST OF DRAWINGS

Figure 2:
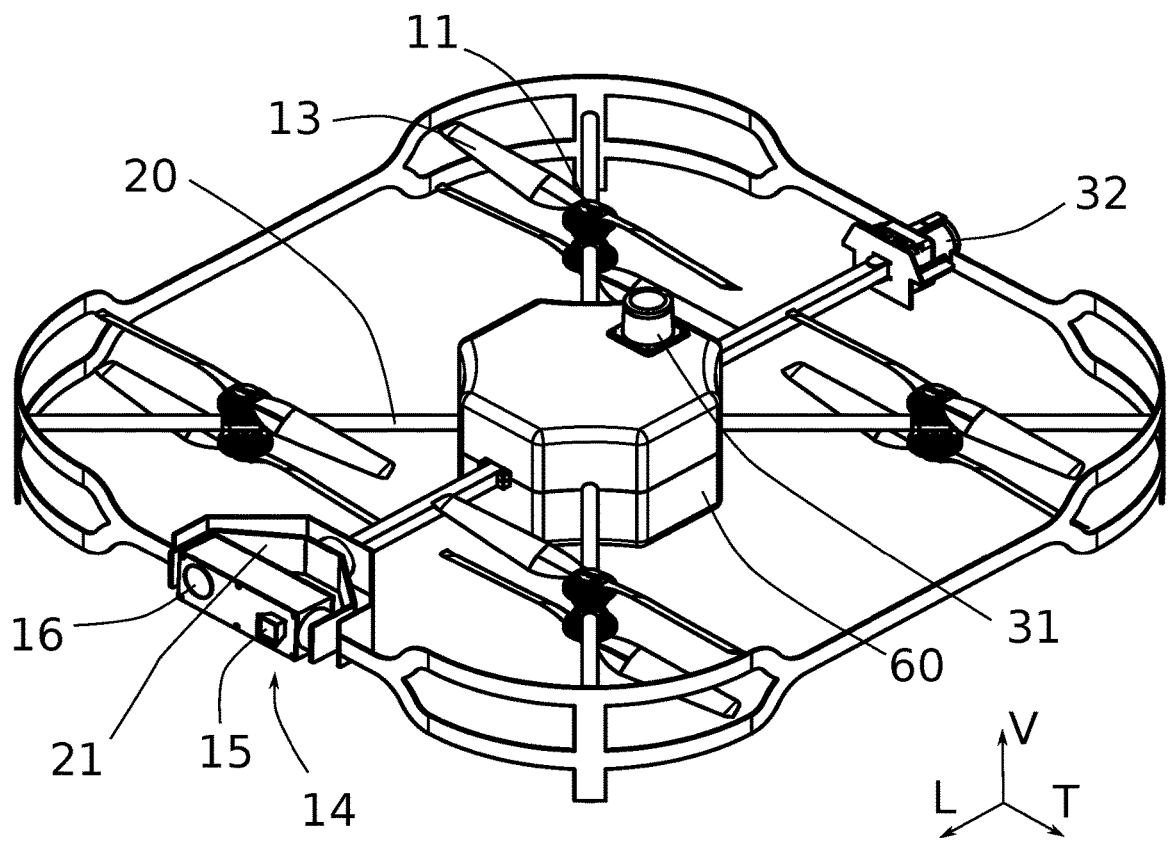
Figure 3:
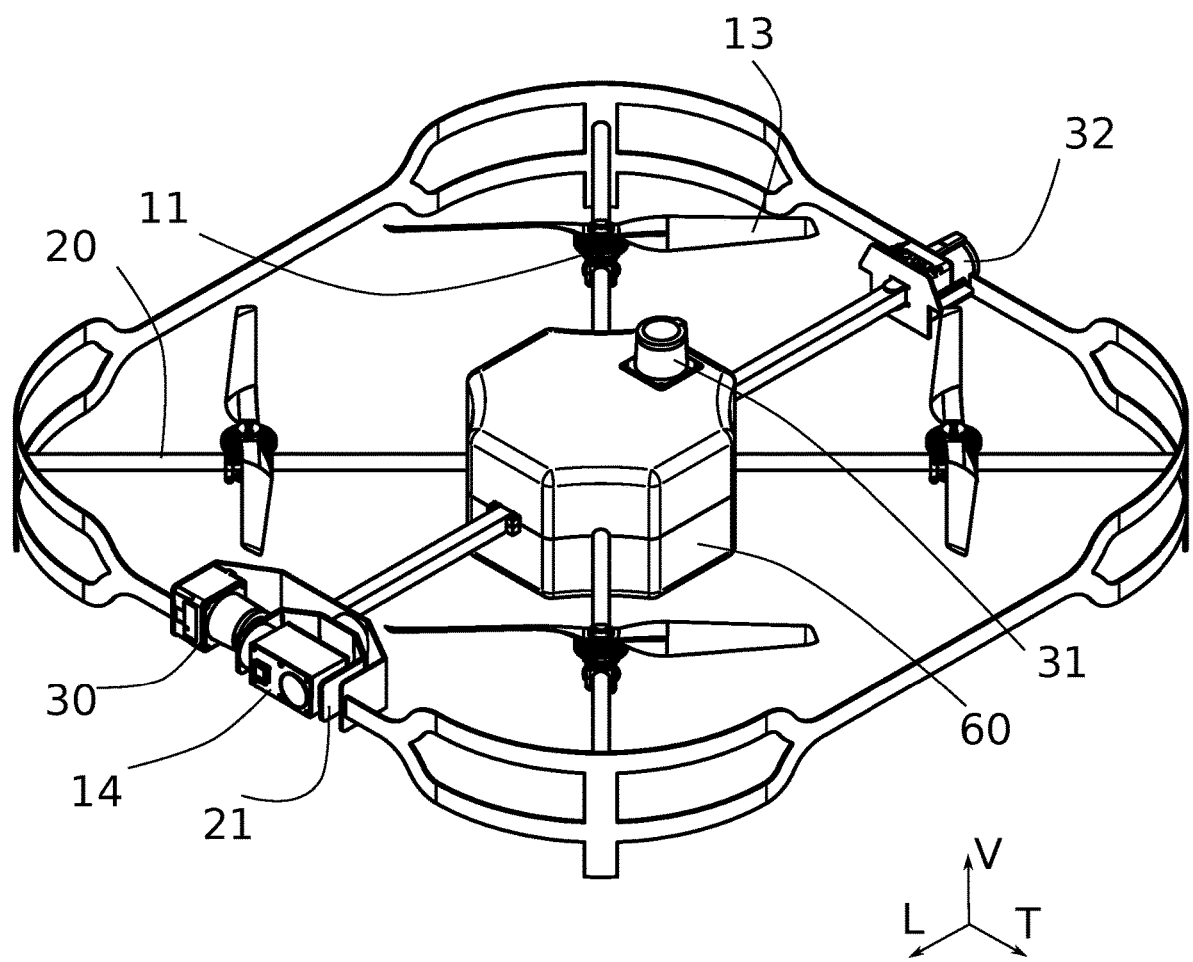
Figure 4:
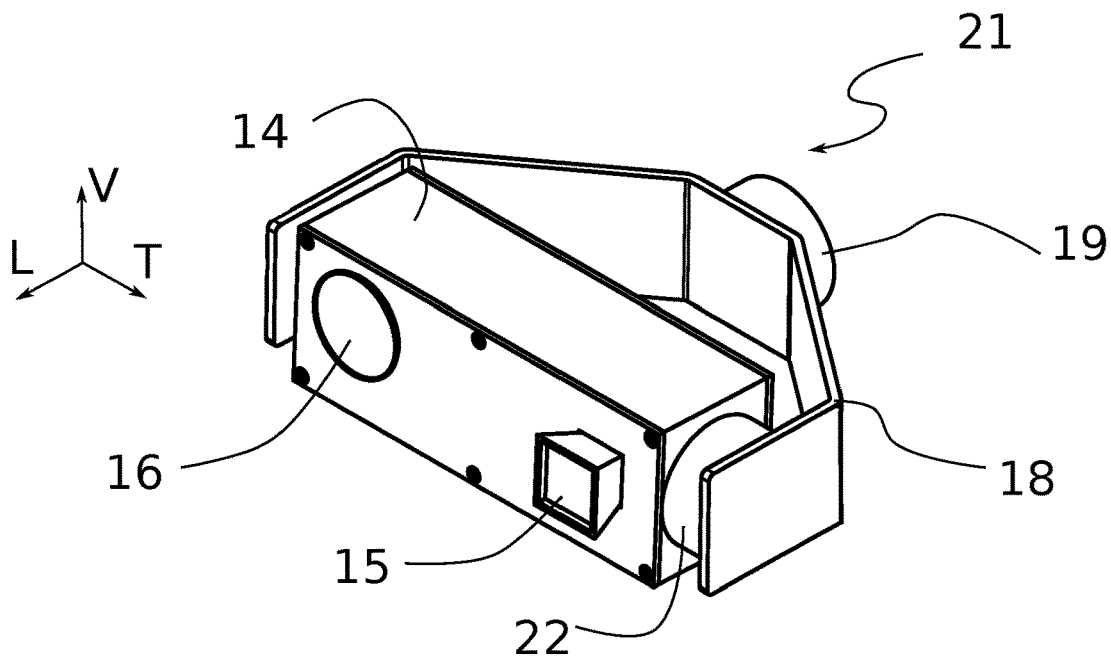
Figure 5:
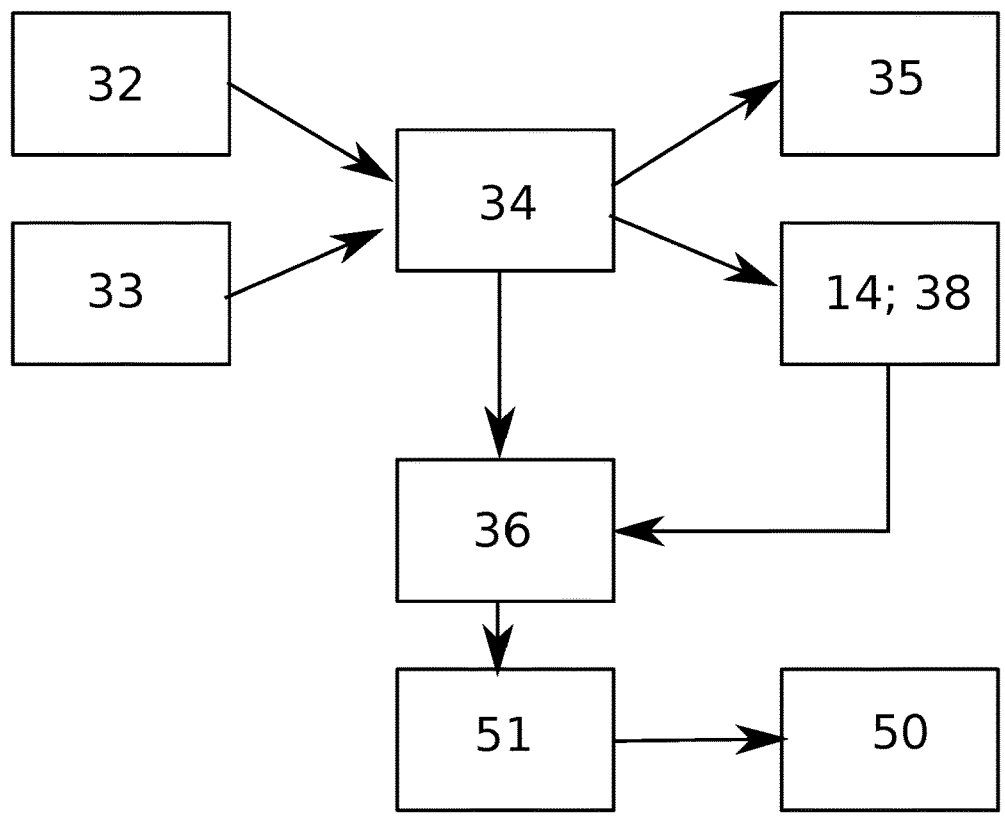

Further objectives, features and advantages of the invention will become apparent upon reading the following description, which is provided solely by way of non-limiting example, and which refers to the appended drawings, in which:

FIG. 1 is a schematic perspective view of a flying craft according to one embodiment of the invention during the acquisition of a three-dimensional measurement, FIG. 2 is a schematic perspective view of a flying craft according to one embodiment of the invention, FIG. 3 is a schematic perspective view of a flying craft according to another embodiment of the invention, FIG. 4 is a schematic perspective view of a pod of a craft according to one embodiment of the invention, and FIG. 5 is a functional schematic view of a pod of a craft according to one embodiment of the invention.

6. DETAILED DESCRIPTION OF AN EMBODIMENT OF THE INVENTION

For the sake of illustration and clarity, scales and proportions are not strictly adhered to in the drawings. Throughout the detailed description which follows with reference to the drawings, unless otherwise indicated, each element of a flying craft according to the invention is described as it is arranged when the craft is in use, horizontally, and moving in a direction of movement referred to as the transverse direction. This arrangement is shown in particular in FIG. 2.

Moreover, identical, similar or analogous elements are denoted using the same reference signs throughout the drawings. Finally, the terms longitudinal, transverse and vertical are used in a non-limiting manner with reference to the trihedron L, T, V as shown in FIG. 2. The longitudinal direction (L) corresponds to the front-to-rear direction of the craft, the transverse direction (T) corresponds to the main direction of movement of the craft parallel to a surface of an object of which a contour measurement of a plurality of regions of interest is to be performed, and the vertical direction (V) is the direction defined by gravity. In other words, the front-to-rear direction of the craft is the longitudinal direction and the right-to-left direction of the craft is the transverse direction and corresponds to the main direction of movement of the craft. A flying craft according to the invention preferably moves parallel to a surface to be measured and the measurement apparatus is preferably arranged at the front of the craft in order to be able to point toward the surface to be measured.

FIG. 1 is a schematic view of a flying craft 10 according to one embodiment of the invention in use on an aircraft 9.

The flying craft 10 moves relative to the surface of the aircraft to acquire a plurality of three-dimensional measurements of a plurality of regions of interest on the surface of the aircraft.

This plurality of regions of interest is, for example, a list of regions provided by an automatic surface inspection system proposed by the applicant in patent application WO2016/203151 which makes it possible to automatically detect a list of defects on a surface of a predetermined object. The invention can therefore use this list of defects as a list of regions of interest to determine the contour of each of these detected defects. According to another variant, the list of regions of interest is provided to the craft, for example, by means of a file of positions to be inspected. These regions of interest can be of all types (contour of doors, panels, any chips, etc.). According to another variant, the list of regions of interest is the entire surface of the object.

In FIG. 1, and only for purposes of illustration, the regions of interest for which a contour measurement is sought are denoted by reference signs 12a, 12b and 12c. In the figure, the regions 12a, 12b are relatively limited regions whereas the region 12c is an extended region which covers the whole of the lateral surface of the vertical fin of the aircraft 9.

FIG. 2 shows the flying craft 10 in more detail. Said craft comprises a carrier frame 20 on which are mounted eight lift and movement motors 11, each motor being associated with a propeller 13. Only one motor 11 and one propeller 13 are denoted by reference signs in FIG. 2 for the sake of clarity. Of course, according to other embodiments, the means for supporting and moving the craft can have other designs without changing the aim of the invention.

The flying craft 10 also comprises a three-dimensional measurement apparatus 14 configured to allow the measurement of a contour of the surface targeted by the apparatus. This apparatus is mounted on a pod 21 which is mechanically connected to the carrier frame 20 at the front of the craft defined with respect to a longitudinal direction (L).

In FIGS. 2 and 3, reference sign 60 denotes a mechanical housing which accommodates all of the craft's control members (management system), tools for analyzing data from the sensors (rangefinders, inertial sensors, etc.), various processing modules (compensation module, module for creating a contour map, etc.), and calculation means (processor, memory, etc.), connected to the measurement apparatus 14 and to the lifting and movement means 11 by wires or wireless connection means.

The craft in FIG. 2 also comprises two laser rangefinders 31, 32.

The apparatus 14 and the pod 21 are shown in more detail in FIG. 4. This pod 21 comprises a U-shaped framework 18 mounted on the frame 20 of the craft by means of a motorized pivot joint 19 which allows the U-shaped framework 18 to be pivoted relative to the frame 20 about an axis extending along the longitudinal direction, as defined in FIG. 2.

The apparatus 14 is itself mounted in the U-shaped framework 18 by a motorized pivot joint 22 which allows the apparatus to be pivoted with respect to the U-shaped framework 18 about an axis extending along the transverse direction, as defined in FIG. 2.

Thus, the apparatus 14 can be moved so as to aim in all directions by controlling the joints 19, 22 (which makes it possible to control the roll and pitch of the apparatus) and by controlling the yaw of the craft, which then defines the yaw of the apparatus. The motorization of the joints 19 and 22 can be of any type and preferably comprises electric motors.

The apparatus 14 also comprises a source 15 for emitting a reference wave, and a matrix receiver 16 of a wave reflected by the region of interest targeted by the apparatus, and a processing unit 38, shown schematically in FIG. 5, configured to be able to determine a measurement of the contour of the region of interest targeted by the apparatus 14 from the analysis of the reference wave and of the reflected wave.

According to one embodiment, the emission source 15 is a camera for emitting structured light, and the matrix receiver 16 is an image acquisition camera. The reference waves and reflected waves are therefore images. According to this embodiment, the camera 15 for emitting structured light can be of any known type, such that the structured light can be a light with a particular pattern (lines, dots, a grid, etc.). The image acquisition camera 16 then acquires images of the various patterns projected onto the region of interest. The processing unit 38 then makes it possible to determine the deformation of the pattern. The analysis of the deformation of the pattern makes it possible to estimate the depth of the surface onto which the structured light is projected.

Various technical and software solutions are available on the market for estimating depth from images acquired from structured light projection and are not described in detail here.

According to another embodiment, the emission source 15 is a laser profilometer and the matrix receiver 16 is a camera for acquiring the image of the region of interest illuminated by the laser profilometer. According to this embodiment, a laser profilometer projects a line onto the region of interest and the acquisition camera acquires an image of the line projected onto the region of interest. The processing unit 38 can then determine the depth of the region of interest following this projected line. Various technical and software solutions are available on the market for estimating depth from a laser profilometer and are not described in detail here.

According to another embodiment, the emission source 15 is a flash lidar and the matrix receiver 16 is a camera for acquiring the image of the region of interest illuminated by the flash lidar. According to this embodiment, the reference wave is a multidirectional laser signal emitted by a flash lidar. The matrix receiver acquires the wave reflected by the region of interest targeted by the emitted wave, and the processing unit 38 determines the depth by comparative analysis of the emitted wave and the reflected wave (typically by measuring the time of flight or by measuring the phase shift). A flying craft according to this embodiment is shown schematically in FIG. 3. In addition, this craft comprises three laser rangefinders 30, 31, 32, including a rangefinder 30 arranged in the vicinity of the measurement apparatus.

Of course, the number of laser rangefinders is not dependent on the type of measurement apparatus used. Thus, nothing prevents the use of a measurement apparatus of the flash lidar type as shown in FIG. 3 with two laser rangefinders, or the use of a measurement apparatus of the structured light type as shown in FIG. 2 with three laser rangefinders.

The flying craft further comprises an automatic management system configured to be able to switch the craft from a mode referred to as navigation mode, in which the craft can be moved from a region of interest toward a subsequent region of interest by controlling the motors 11, to a mode referred to as stabilized mode, in which the motors 11 are controlled so as to be able to keep at least one kinematic parameter of the craft (for example the position of the craft, the speed of the craft, the acceleration of the craft, the attitude of the craft or a combination of these different parameters) constant, making it possible to minimize the vibration of the craft in order to be able to activate the apparatus 14 and proceed to the acquisition of a three-dimensional measurement of the region of interest. As indicated above, this management system is, for example, accommodated in the central housing 60 of the craft and interacts with the sensors of the craft (laser rangefinders and internal sensor) and the motors 11.

To do this, the automatic management system is preferably configured to be able, in the vicinity of each region of interest, to switch from navigation mode to stabilized mode when the craft is in a state adjacent to an anticipation state defined with respect to an acquisition state.

The principle of mode switching implemented by the management system is as follows.

The term "state of the craft" denotes the kinematic properties of the craft, such as the position of the craft, the speeds of the craft (angular and/or translational), the orientations of the measurement apparatus, the accelerations of the craft, etc. This state is determined, for example, by laser sensors, inertial sensors and by a craft location module. This location module can be of any type and is, for example, that described in patent application WO2017/121936 on behalf of the applicant.

The term "acquisition state" denotes the target state of the craft for acquiring the region of interest in question. This acquisition state is determined by a position, a speed and an orientation of the acquisition apparatus, for example.

The term "navigation principle" denotes the principle which makes it possible to calculate, from a measured state and a given trajectory, the acceleration necessary, along the 3 axes, to follow the given trajectory. The calculated necessary acceleration is by nature scalable since the state of the craft changes at each moment.

The term "control principle" denotes the principle which makes it possible to calculate, from a measured state and an acceleration instruction, the motor commands necessary to reach the target acceleration. Typically, the acceleration at the input of the control principle is that calculated by the navigation principle. For example, if a lateral acceleration is requested, the control principle will make it possible to reduce the speed of the motors on the corresponding side in order to tilt the craft. The output (the rotational speed of the motors) varies more as the input (the controlled acceleration) varies. Moreover, in the navigation principle, given that the controlled acceleration is constantly varying, the same applies to the control of the actuators (the motors).

The term "acquisition principle" denotes the principle which makes it possible to calculate, from the state of the craft and the acquisition state, the constant kinematic parameter (in practice the acceleration) likely to lead to ideal acquisition conditions.

Sc denotes the target state of the craft for acquisition, which is characterized by the desired position Pc, and the desired speed Vc. The aim is to approach the state of the craft as close as possible to this state while having a constant acceleration when the craft is closest to it.

Sm denotes the measured state of the craft at a given moment characterized by the position Pm and the speed Vm at this given moment.

ΔTanticipation defines the anticipation time of the stabilized mode for acquisition, for example ΔTanticipation=1 s.

The management process is then as follows:
Step 1: the management system selects the next acquisition state Sc. It then calculates an anticipation state Sa, characterized by an anticipation position Pa and an anticipation speed Va of this acquisition state assuming zero acceleration during ΔTanticipation between Sa and Sc. Therefore, quite simply, Va=Vc and Pa=Pc−ΔTanticipation*Vc. The management system then calculates a trajectory up to the anticipation state Sa.

Step 2: the navigation principle continuously calculates and updates a controlled acceleration, making it possible to follow the trajectory up to the anticipation state Sa. This acceleration, which varies regularly with turning, interferences and measurement uncertainties, is transmitted to the control principle which controls the actuators on this basis, and the craft therefore follows the imposed trajectory.

Step 3: When the measured state of the craft Sm is sufficiently close to the anticipation state Sa (defined, for example, by a difference threshold in speeds and accelerations), the acquisition principle calculates the constant acceleration AccelAcquisition, which would allow the craft to get the closest to the acquisition state Sc, on the basis of the measured state Sm, and the time period at the end of which the craft would be the closest: ΔTtrigger. ΔTtrigger is by design very close to ΔTanticipation, but can vary slightly to compensate for the difference between Sm and Sa at the time of calculation. Likewise, the calculated acceleration AccelAcquisition is close to zero, but is not zero, so as to compensate for the difference between Sm and Sa. In other words, the fact that ΔTtrigger and AccelAcquisition are recalculated rather than the theoretical values being used makes it possible to freeze an acceleration while compensating for the differences between Sm and Sa (navigation and measurement innacuracy, interferences, etc.). The management system then uses the acceleration AccelAcquisition for the control principle. The control principle having, as an input, a constant acceleration, the attitude (or elevation or inclination), and the average thrust of the craft, no longer varies, and the variations of the motor controls are low. The craft is then "free wheeling". The moment of switching Tc is recorded.

Step 4: At the Tc+ΔTtrigger moment, the acquisition is commanded. The craft remains in stabilized mode and at a constant attitude for the acquisition duration ΔTacquisition. At the Tc+ΔTtrigger+ΔTacquisition moment, the acquisition is complete. If the acquisition was successful, the list of acquisition states is updated accordingly. Throughout this step, if the craft moves too far from the theoretical trajectory, it immediately returns to step 1 for safety reasons.

These different steps implemented by the management system preferably use software means on a component on board the flying craft. In general, the system can comprise software and/or hardware means for implementing the various steps of the management system.

According to a preferred embodiment, the flying craft further comprises a compensation module 36 of the three-dimensional measurements acquired by the measurement apparatus 14 suitable for defining a movement profile of the craft during the acquisition and correcting the measurements on the basis of this movement profile.

Throughout the text, the term module denotes a software component, a subset of a software program, which can be compiled separately, either for independent use, or to be assembled with other modules of a program, or a hardware component, or a combination of a hardware component and a software subprogram.

Thus, a module can be implemented in the form of a computer program executed by one or more electronic components, for example a processor of a computer, microcontroller, digital signal processor (DSP), field-programmable gate array (FPGA), etc. In general, a module is therefore a (software and/or hardware) element which makes it possible to perform a function.

The compensation process of the measures implemented by the compensation module is, for example, the following:

Step 1: the raw data from the various sensors (measurement apparatus, inertial sensors, etc.) are saved and time-stamped, Step 2: the position, speed and acceleration data are synchronized with this raw data, Step 3: a movement profile during acquisition is created from the position, speed and acceleration data. This movement profile can, for example, be determined taking into consideration that the acquisition time is relatively short and the acceleration of the craft constant. Thus, one way to calculate this movement profile is to use a model with constant acceleration for the translation part and constant angular speed for the rotation part. Such a mathematical model can, for example, be written as follows, over the acquisition duration:

$$P(t) = \frac{1}{2} * A0 * t^2 + V0 * t + P0$$

$$\Omega(t) = \Omega 0 + t * \omega 0$$

From the acquired data, it is possible to find A0, V0, P0, Ω0 and ω0, such that the model is closest to the acquired position and inertial data. Many optimization methods exist to solve this numerical problem. Once the constants have been determined, the above equations make it possible to obtain a good estimate of the position and orientation of the sensor at each moment of the acquisition. Other types of mathematical models can be used, for example by freezing the speed, or allowing variations in acceleration, etc. It is also possible to filter the data to create a profile without any particular shape. Different digital filters can be used, such as a low-pass filter, a complementary filter, etc.

Step 4: each raw acquisition data item is corrected according to the movement profile determined in this way.

Once this measurement compensation has been carried out, a subsequent step of data fusion and creation of a depth map can be implemented by an ad-hoc module, including any filtering and noise rejection can be implemented (either on board the craft, or after repatriation of data to the ground). A subsequent step of characterization and segmentation of measurements can also be implemented by an ad-hoc module (either on board the craft, or on the ground after data has been returned to the ground). Different methods available in the literature make it possible to carry out such data segmentation.

For example, these different steps can be carried out as follows by one or more modules:

Step 1: Determining a reference contour for the surface. The aim of this step is to define a reference contour for the surface that has been measured in order to compare the measurement to the reference. The reference contour can be extracted directly from a 3D model of the surface, or estimated by a mathematical model, or the two techniques can be combined.

For example, if it is extracted from the 3D model, the reference surface can be a plane or a portion of a cylinder at a given position of the measurement.

If a mathematical model is used, the reference surface can be a plane, a portion of a cylinder or a general parametric shape of which the coefficients and position are calculated to be as close as possible to the measured contour. Advantageously, the reference contour is calculated by a combination of the two techniques: the 3D reference model indicates the type and the main parameters of the reference parametric shape (for example, a cylindrical portion with a given radius) and the position of the parametric reference shape is estimated by the mathematical model.

Step 2: Calculating the differences between the measured contour and the reference contour. This step makes it possible to calculate, at each point of the measured surface, the position or variation of the surface with respect to the reference: positive values indicate protrusions of material, and negative values indicate hollows. This step allows a depth map containing any defects to be created. Advantageously, this step also contains a filtering step, for example of the Gaussian or median type, to reduce the measurement noise and obtain a depth map that is easier to use.

Step 3: Locating local extrema on the depth map. The aim of this step is to identify all the regions where the surface variation in absolute value is above a certain threshold; for example 0.5 mm. These regions are a priori structural defects.

Step 4: Characterizing each local extrema. For each of the regions found in step 3, the objective is to calculate several quantities which make it possible to easily characterize the defect. Typically, the following values will be calculated:

Maximum depth or protrusion,

Surface of the defect,

Maximum slope of the defect.

Depending on the application, other quantities can also be calculated, and all the quantities used make it possible to provide a textual characterization of the defect.

The execution of all of steps 1 to 4 for each acquisition makes it possible to establish a list of defects characterized by a depth map, representative quantities and a textual indication.

Advantageously, global statistics can also be generated, and additional indications calculated from knowledge of all the defects. For example, the defect density can be calculated per region, and the closest distance of each defect to the other defects. These data can be useful to better assess the acceptability or otherwise of certain damage. Finally, the system can be programmed to automatically give an indication of what to do next, such as repair or monitoring, according to preprogrammed rules. These preprogrammed rules can, for example, be integrated in the 3D model and thus depend on the location of the defects.

FIG. 5 is a functional diagram of the various means implemented by the motorized flying craft for measuring the contour of a plurality of regions of interest of a surface of a predetermined object to be inspected according to a preferred embodiment of the invention.

Such a craft comprises at least one laser rangefinder 32 and at least one inertial system 33. Such an inertial system 33 comprises, for example, three accelerometers and three gyroscopes. The laser rangefinder 32 and the inertial system 33 are mounted on the frame 20 of the craft or directly on the pod 21.

The data from these two instruments feed a module 34 for calculating the position of the mobile craft and for controlling the three-dimensional measurement apparatus 14.

This module 34 manages the implementation of the control principle 35 described above in connection with the management system.

The calculation module 34 and the control principle 35 form the management system.

Once the three-dimensional measurements have been acquired by the measurement apparatus 14, the compensation module 36 corrects the measurements on the basis of the movement profile determined by the process described above.

According to an embodiment not shown in the drawings, the craft further comprises a module for accessing a three-dimensional model of the surface of the aircraft 9 and a module for locating the relative position of the craft 20 with respect to with this three-dimensional model of the surface of the aircraft to be inspected, so as to be able to associate, with each region of interest (12a, 12b, 12c) targeted by the measurement apparatus (14), the coordinates of the region of interest in a reference point of the three-dimensional model of the surface. This 3D model is, for example, a polygonal model of the surface of the object. The module for locating the position of the craft with respect to this 3D model can be of any type. It may, for example, be a module which implements the principles described in patent application WO2017/121936 on behalf of the applicant.

The corrected data can then be transmitted to a ground station 50 via a communication system 51. This transmission of the corrected data to a ground station 50 is, for example, a wireless transmission, which can be of any type.

The invention claimed is:

1. A motorized flying craft for measuring the contour of a plurality of regions of interest of a surface of a predetermined object to be inspected, said flying craft comprising:

a carrier frame, motorized means for lifting and moving said carrier frame, an apparatus for three-dimensional measurement of a region of interest targeted by said apparatus, which apparatus is mounted on a pod which is mechanically connected to said carrier frame, said apparatus comprising a reference wave emission source, a matrix receiver of a wave reflected by said region of interest targeted by said apparatus, and a processing unit configured to be able to determine a measurement of the contour of said region of targeted by said apparatus from the analysis of said reference wave and said reflected wave, an automatic management system of said craft, which system is configured to be able to switch said craft from a navigation mode in which the craft can be moved from one region of interest toward a subsequent region of interest by controlling motorized lifting and movement means, to a stabilized mode in which said motorized lifting movement means are controlled so as to be able to keep at least one kinematic parameter of said craft constant, selected from the group comprising the speed of the craft, the acceleration of the craft, the attitude of the craft, and a function of one or more of these parameters, making it possible to minimize the vibration of said craft, and in which said measurement apparatus can acquire a three-dimensional measurement of a region of interest;

said automatic management system being configured to be able, in the vicinity of each region of interest, to switch from the navigation mode to the stabilized mode when said craft is in a state which is defined by said kinematic parameter of the craft and adjacent to an anticipation state, which is defined by at least this kinematic parameter of the craft, and determined from an acquisition state which corresponds to a target value of this kinematic parameter for carrying out the acquisition of this region of interest, and to an anticipation time delay which corresponds to the time necessary to guarantee that this parameter is kept constant by the craft, allowing the acquisition of a three-dimensional measurement of said region of interest by said measurement apparatus.

2. The craft according to claim 1, wherein at least one kinematic parameter of the craft kept constant in said stabilized mode is selected from the group comprising the position of the craft, the speed of the craft, the acceleration of the craft, the attitude of the craft, and a function of one or more of these parameters.

3. The craft according to claim 1, wherein said pod comprises a motorized joint having at least one pitch axis of the measurement apparatus relative to said carrier frame, so as to be able to position said apparatus opposite a region of interest to be measured.

4. The craft according to claim 1, wherein the craft further comprises at least one laser rangefinder which is rigidly connected to said carrier or to said pod and which forms a sensor of the relative position of the flying craft with respect to said surface of the object to be inspected.

5. The craft according to claim 4, wherein said automatic management system is configured to be able to control the switch to the stabilized mode as soon as the laser rangefinder(s) determine(s) that the craft is at a predetermined position of said region of interest.

6. The craft according to claim 1, wherein the craft further comprises a compensation module of the three-dimensional measurements acquired by said apparatus suitable for defining a movement profile of said craft during said acquisition and correcting said measurements on the basis of this movement profile.

7. The craft according to claim 1, wherein the craft further comprises a module for accessing a three-dimensional model of said surface of said object and a module for locating the relative position of the craft with respect to said three-dimensional model of said surface of said object to be inspected, so as to be able to associate, with each region of interest targeted by said measurement apparatus, the coordinates of the region of interest in a reference point of said three-dimensional model of said surface.

8. The craft according to claim 1, wherein the craft further comprises a module for wireless transmission of the contour measurements to a ground station.

9. The craft according to claim 1, wherein the craft further comprises a module determining a depth map comprising a sub-module for determining a reference contour of said surface of said inspected object from a predetermined 3D model of said surface of the inspected object associated with a predetermined mathematical model, and a sub-module for calculating the differences in depth between said measurements of the contour of said predetermined regions and said reference contour.

10. The craft according to claim 1, wherein said three-dimensional measurement apparatus comprises a camera for emitting structured light, which forms said emission source of said reference wave, and a camera for acquiring images of said region of interest illuminated by structured light, which forms said matrix receiver of said reflected wave.

11. The craft according to claim 1, wherein said three-dimensional measurement apparatus comprises a laser profilometer, which forms said emission source of said reference wave, and a camera for acquiring images of said region of interest illuminated by said laser profilometer, which forms said matrix receiver of said reflected wave.

12. The craft according to claim 1, wherein said three-dimensional measurement apparatus comprises a flash lidar, which forms said emission source of said reference wave, and a camera for acquiring images of said region of interest illuminated by said flash lidar, which forms said matrix receiver of said reflected wave.

13. The craft according to claim 1, wherein said motorized means for lifting and moving said craft comprise at least four propulsion motors.

14. A method of controlling a motorized flying craft, the method comprising:
defining a list of regions of interest of a surface of a predetermined object to be inspected,
defining a navigation profile of the craft between the different regions of interest according to a predetermined chronology,
moving the flying craft toward a first region of interest,
adjusting the pod of the craft so that it points to said region to be measured with said three-dimensional measurement apparatus,
in the immediate vicinity of the region of interest, switching the craft to stabilized mode and triggering the acquisition of the three-dimensional measurement of the region of interest,
when the acquisition is finished, switching the craft to navigation mode,
moving the flying craft toward the next region of interest of the navigation profile and repeating the previous operations until the last region of interest of said navigation profile.

* * * * *